(12) United States Patent
Kiyosawa et al.

(10) Patent No.: US 8,864,387 B2
(45) Date of Patent: Oct. 21, 2014

(54) RETAINER FOR ROLLER BEARING AND NEEDLE ROLLER BEARING

(75) Inventors: Yoshihide Kiyosawa, Nagano (JP); Keiji Ueura, Nagano (JP); Sohei Beppu, Nagano (JP)

(73) Assignee: Harmonic Drive Systems, Inc., Tokyo (JP)

( * ) Notice: Subject to any disclaimer, the term of this patent is extended or adjusted under 35 U.S.C. 154(b) by 0 days.

(21) Appl. No.: 14/008,740

(22) PCT Filed: May 24, 2011

(86) PCT No.: PCT/JP2011/002896
§ 371 (c)(1),
(2), (4) Date: Sep. 30, 2013

(87) PCT Pub. No.: WO2012/160603
PCT Pub. Date: Nov. 29, 2012

(65) Prior Publication Data
US 2014/0016892 A1   Jan. 16, 2014

(51) Int. Cl.
*F16C 33/48* (2006.01)
*F16C 33/56* (2006.01)
*F16C 33/46* (2006.01)
*F16C 19/26* (2006.01)
*F16C 19/28* (2006.01)

(52) U.S. Cl.
CPC .............. *F16C 33/56* (2013.01); *F16C 33/467* (2013.01); *F16C 33/4676* (2013.01); *F16C 33/48* (2013.01); *F16C 33/4635* (2013.01); *F16C 2208/20* (2013.01); *F16C 19/26* (2013.01); *F16C 19/28* (2013.01)
USPC .......................................... 384/572; 384/576

(58) Field of Classification Search
USPC ......................................... 384/572, 576, 580
See application file for complete search history.

(56) References Cited

U.S. PATENT DOCUMENTS

| | | | | |
|---|---|---|---|---|
| 3,445,907 A | * | 5/1969 | Greby | 29/898.067 |
| 3,494,684 A | * | 2/1970 | Benson | 384/580 |
| 4,472,007 A | | 9/1984 | De Vito | |
| 4,952,079 A | * | 8/1990 | Lingner | 384/575 |
| 5,033,878 A | * | 7/1991 | Tsuji et al. | 384/576 |
| 5,647,674 A | * | 7/1997 | Ohashi et al. | 384/580 |
| 5,772,338 A | * | 6/1998 | Hillmann et al. | 384/470 |
| 6,068,409 A | | 5/2000 | Sakai | |
| 2009/0208161 A1 | * | 8/2009 | Jauernig et al. | 384/572 |

FOREIGN PATENT DOCUMENTS

| | | | |
|---|---|---|---|
| DE | 3134241 A | * | 7/1983 |
| JP | S63-08333 B2 | | 2/1988 |
| JP | H05-52348 U | | 7/1993 |

(Continued)

OTHER PUBLICATIONS

International Search Report for PCT/JP2011/002896, Aug. 9, 2011.

*Primary Examiner* — Phillip A Johnson

(57) ABSTRACT

A retainer for a roller bearing holds needle rollers within slit-shaped pockets which are formed separately by means of partitions arranged with a fixed pitch in the circumferential direction. Each partition is equipped with two side faces, which face the sides of the adjacent partitions, and an outer-circumferential-side end face, which faces the outer circumferential side of the retainer, and retaining protrusions are formed at the corner parts where the outer-circumferential-side end faces and each side face intersect. Each retaining protrusion protrudes farther to the outer circumferential side from the outer-circumferential-side end face, and protrudes obliquely in the direction in which the aperture width of the pockets is narrowed. For each pocket the positions where the retaining protrusions are formed in the longitudinal direction of the partitions are set so as not to overlap the adjacent pockets.

7 Claims, 4 Drawing Sheets

(56) References Cited

FOREIGN PATENT DOCUMENTS

| JP | H07-293569 A | 11/1995 |
|----|--------------|---------|
| JP | H09-79270 A | 3/1997 |
| JP | H10-26141 A | 1/1998 |
| JP | H11-166542 A | 6/1999 |
| JP | 2006-132622 A | 5/2006 |
| JP | 2008-286232 A | 11/2008 |
| JP | 2010-65798 A | 3/2010 |

* cited by examiner

US 8,864,387 B2

RETAINER FOR ROLLER BEARING AND NEEDLE ROLLER BEARING

TECHNICAL FIELD

The present invention relates to a roller bearing used in a variety of machinery, and in particular relates to the improvement of a retainer for a roller bearing for holding needle rollers arranged in fixed intervals in a circumferential direction.

BACKGROUND ART

In a needle roller bearing (needle bearing) that uses needle rollers as rolling bodies, numerous rollers are held by a cylindrical retainer in which pockets for accommodating the rollers are formed at a fixed pitch in a circumferential direction. In this type of retainer, the pockets open into the inner circumferential face and the outer circumferential face of the retainer, and adjacent pockets are partitioned by columnar partitions arranged in the circumferential direction.

The inner-circumferential-side openings or the outer-circumferential-side openings of the pockets are shaped so that the accommodated rollers are retained. For example, the retainer is made from a cylindrical resin, and retaining protrusions are formed in the edges of the inner-circumferential-side openings or the outer-circumferential-side openings of the pockets. With such a configuration, the protrusions can be elastically deformed by pressing force and the rollers can be pushed into the pockets. The rollers can also be prevented from dislodging because the protrusions elastically revert after being fitted into the pockets. Patent Documents 1 and 2 disclose this type of resin-formed retainer for a needle roller bearing.

PRIOR ART DOCUMENTS

Patent Documents

[Patent Document 1] JP-A 7-293569
[Patent Document 2] JP-A 2008-286232

SUMMARY OF THE INVENTION

Problems to be Solved by the Invention

When a resin-formed retainer such as the one described above is manufactured by integrated molding, cores having the same cross-sectional shape as the pockets are arranged in a radial formation at a fixed pitch, cavities having the same cross-sectional shape as the partitions are formed by arranging an inner mold and an outer mold on the inner circumferential sides and outer circumferential sides of the cores, and molten resin is poured into the cavities and allowed to harden. When the molds are to be removed, the cores must be forced out and removed because of the presence of the protrusions.

Because the rollers in a needle roller bearing are thin, a thin-walled retainer must be used in which the thickness in the radial direction is small. When the interval between adjacent rollers is reduced in order to increase the number of rollers fitted in, there is also a reduction in the circumferential thickness of the partitions that partition adjacent pockets, and strength is compromised. With such a low-strength resin-formed retainer, it is difficult to force out and remove the cores during manufacture. Therefore, it is difficult to integrally mold the retaining protrusions with the retainer.

With the foregoing in view, it is an object of the present invention to provide a configuration whereby protrusions that prevent rollers from dislodging can be integrally molded with a retainer when a thin and low-strength resin-formed retainer for a roller bearing is manufactured.

Means to Solve the Problems

To solve the problems described above, according to the present invention there is provided a resin-formed retainer for a roller bearing in which a plurality of pockets for rotatably holding individual needle rollers are arranged at a fixed pitch in the circumferential direction; the retainer for a roller bearing characterized in comprising:

a plurality of partitions for partitioning adjacent pockets, the partitions extending in the center axial direction of an arrangement of a plurality of pockets; and retaining protrusions integrally molded on each of the partitions;

each of the partitions having side faces that face the sides of adjacent partitions, and an outer-circumferential-side end face that faces the outer circumferential side of the arrangement of the plurality of pockets;

the retaining protrusions being provided in corner parts where the side faces and the outer-circumferential-side end faces of the partitions intersect;

the retaining protrusions having inner side inclined parts that protrude from the side faces and protrude progressively farther towards the sides of the corner parts, and outer side inclined parts that protrude from the outer-circumferential-side end faces and protrude progressively farther towards the sides of the corner parts; and tips of the retaining protrusions, which are connected extensions of the inner side inclined parts and the outer side inclined parts so as to cover the corner parts, protruding more to the outer circumferential side by a predetermined amount from the outer-circumferential-side end faces and extending to positions of protruding in the circumferential direction by a predetermined amount from the side faces.

Due to the shape of these retaining protrusions in the present invention, using cores to integrally mold the partitions and the retaining protrusions makes it possible to reduce the force acting on the partitions when the cores are forced out. Specifically, the retaining protrusions in the present invention are not simply shaped so as to protrude into the pockets, but extend in a direction so as to protrude farther towards the edges of the pockets, the retaining protrusions protruding more to the outer circumferential side beyond the edges of the pockets (the corner parts where the side faces and the outer-circumferential-side end faces intersect). In such a configuration, the tips of the protrusions can elastically deform without restriction when the cores are forced out; therefore, the force acting on the main bodies of the partitions is less than when the retaining protrusions are merely made to protrude into the pockets. Therefore, a dimension by which the protrusions needed to retain the needle rollers protrude is ensured, while the force acting on the partitions when the cores are forced out can be less than that employed in conventional practice. Consequently, the retainer for a roller bearing can be integrally molded from a resin even when the strength of the partitions is reduced by narrowing the gaps of the pockets for holding the needle rollers.

In the present invention, the retaining protrusions protruding into the pockets are preferably arranged so that their positions in the center axial direction do not overlap those of the retaining protrusions protruding into adjacent pockets. Thus, the force acting when the cores on both sides of the partitions are forced out is not concentrated on specific locations of the partitions. Therefore, the cores can be forced out even when the partitions are low in strength.

In this case, the plurality of pockets include first pockets in which the retaining protrusions are provided to one end and another end in the center axial direction; and second pockets in which the retaining protrusions are provided to predetermined positions between the one end and the other end of the partitions, the first pockets and the second pockets preferably being arranged alternatingly in the circumferential direction. Thus, when the cores on both sides of the partitions are forced out, force is dispersed to a plurality of locations in the partitions: the one end, the other end side, and the predetermined positions in between; and force can be prevented from being concentrated in a single location. Therefore, the cores can be forced out even when the partitions are low in strength.

In the present invention, there are provided a first annular section and a second annular section arranged coaxially with the arrangement of the plurality of pockets and sandwiching the partitions from both sides in the center axial direction, the plurality of partitions link the first annular section and the second annular section to each other, the outer circumferential faces of the first annular section and the second annular section are in the same imaginary cylindrical surface, and the outer-circumferential-side end faces of the partitions are provided in positions retracted by a predetermined dimension radially inward from this imaginary cylindrical surface. Thus, the pockets can be formed by the first annular section, the second annular section, and the partitions. The retaining protrusions can also be made not to protrude farther outward than the outer circumferential faces of the first annular section and the second annular section.

The present invention can be configured as follows:

An arrangement in which a plurality of pockets are arranged at a fixed pitch in the circumferential direction is formed in two rows in the center axial direction of the arrangement. The plurality of partitions are configured from a first partition group in which the pockets constituting one of the two arrangements are partitioned apart from each other, and a second partition group in which the pockets constituting the other arrangement are partitioned apart from each other. A first annular section, a second annular section, and a third annular section are arranged coaxially with the two arrangements. The first annular section, the first partition group, the second annular section, the second partition group, and the third annular section are arranged in the stated order along the center axial direction. The partitions of the first partition group link the first annular section and the second annular section to each other, and the partitions of the second partition group link the second annular section and the third annular section to each other. With this configuration, there is obtained a retainer for a roller bearing capable of holding needle rollers in two arranged rows.

In this case as well, the outer circumferential faces of the first annular section, the second annular section, and the third annular section can lie in the same imaginary cylindrical surface, and the outer-circumferential-side end faces of the partitions constituting the first partition group and the second partition group can be provided to positions retracted a predetermined dimension radially inward from this imaginary cylindrical surface. Thus, the retaining protrusions can be made to not protrude farther outward than the outer circumferential faces of the first through third annular sections.

The needle roller bearing of the present invention is further characterized in that a plurality of needle rollers arranged at a fixed pitch in the circumferential direction are rotatably held by the retainer for a roller bearing described above.

Effect of the Invention

According to the present invention, the retaining protrusions are not shaped so as to merely protrude into the pockets, but to extend in a direction so as to protrude farther as they progress towards the edges of the pockets, and the retaining protrusions protrude more to the outer circumferential side past the edges of the pockets (the corner parts where the side faces and the outer-circumferential-side end faces intersect). Thus, the tips of the protrusions can elastically deform without restriction when the cores are forced out, whereby the force acting on the main bodies of the partitions is less than when the retaining protrusions are made to merely protrude into the pockets. Therefore, a dimension by which the protrusions needed to retain the needle rollers protrude is ensured, while the force acting on the partitions when the cores are forced out can be made less than that employed in conventional practice. Consequently, the retainer for a roller bearing can be integrally molded from a resin even when the strength of the partitions is reduced by narrowing the gaps of the pockets for holding the needle rollers.

MODE FOR CARRYING OUT THE INVENTION

A retainer for a roller bearing according to an embodiment of the present invention is described below with reference to the drawings.

Figure 1:
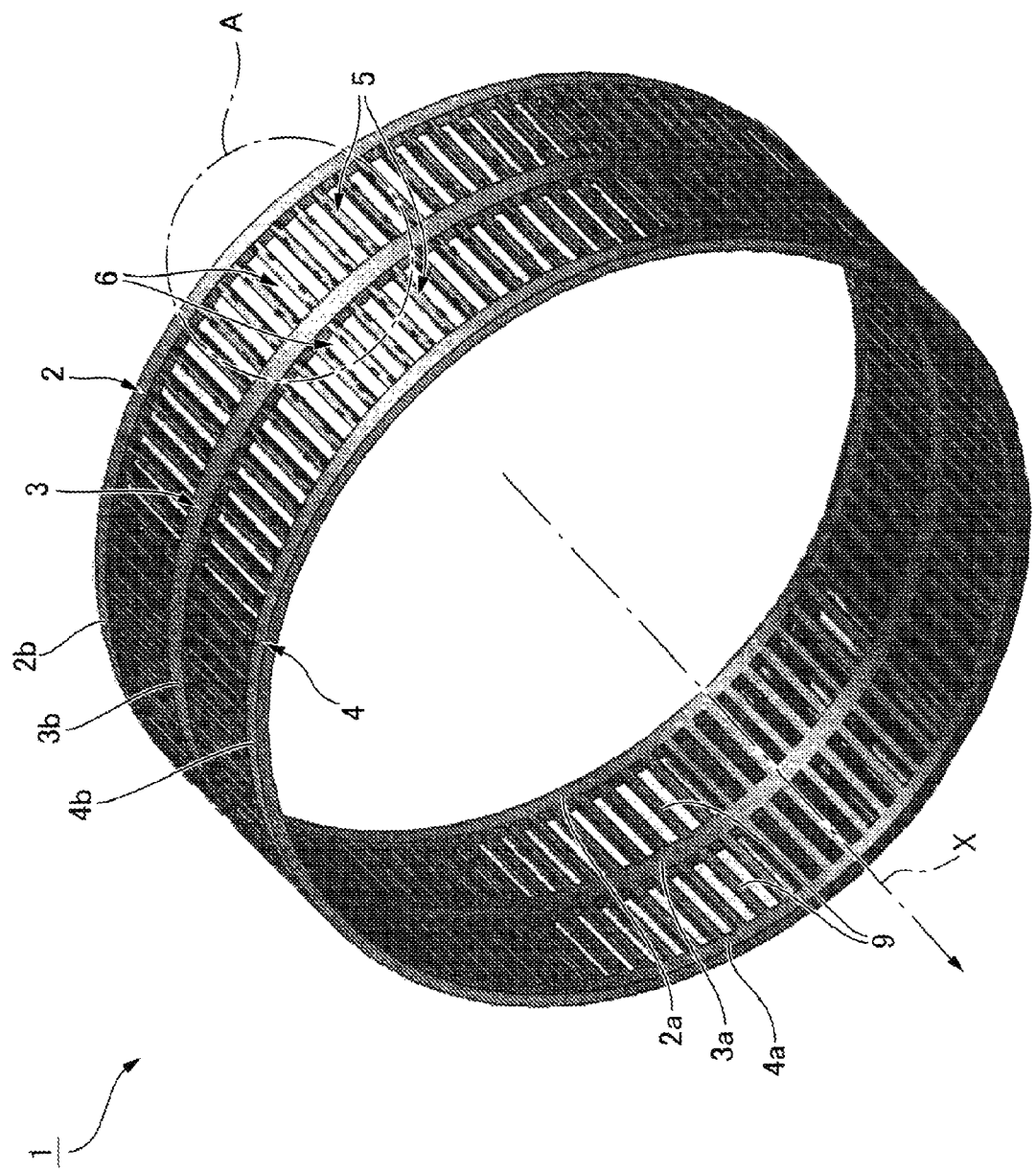
FIG. 1 is a perspective view of a retainer for a roller bearing to which the present invention is applied.

FIG. 1 is a perspective view of a retainer for a roller bearing to which the present invention is applied. As shown in the drawing, a roller-bearing retainer 1 ("retainer 1") is of a substantially cylindrical shape that can be incorporated between an inner race and outer race (not shown) that are in a coaxial arrangement. The retainer 1 comprises three annular sections (a first annular section 2, a second annular section 3, and a third annular section 4) that are in a coaxial arrangement. These sections have the same shape, and their inside and outside diameters are of the same size. The first annular section 2, the second annular section 3, and the third annular section 4 are arranged at equal intervals along the center axis of the retainer 1 (the X direction shown in FIG. 1).

Numerous partitions 5 extending in the center axial direction of the retainer 1 are arranged at a fixed pitch in the circumferential direction between the first annular section 2 and the second annular section 3. The first annular section 2 and the second annular section 3 are linked to each other by these partitions 5. Numerous partitions 5 are similarly arranged at a fixed pitch in the circumferential direction between the second annular section 3 and the third annular section 4, and the second annular section 3 and the third annular section 4 are linked to each other by these partitions 5.

A slit-shaped space between a partition 5 and another adjacent partition 5 is used as a pocket 6 for causing a needle roller R (see FIG. 3) to be rotatably retained. The pockets 6 open towards both the inner circumferential face and the outer circumferential face of the retainer 1. Two sets of an annular arrangement of pockets 6 arranged at a fixed pitch in the circumferential direction are provided in the retainer 1 by the three annular sections described above and the numerous partitions 5 arranged between the annular sections. The widthwise dimension of each pocket 6 is dictated by the interval at which two adjacent partitions 5 are arranged. The dimension of each pocket 6 in the longitudinal direction is dictated by the interval at which two annular sections (either the first annular section 2 and the second annular section 3 or the second annular section 3 and the third annular section 4) linked by these partitions 5 are arranged.

Figure 2:
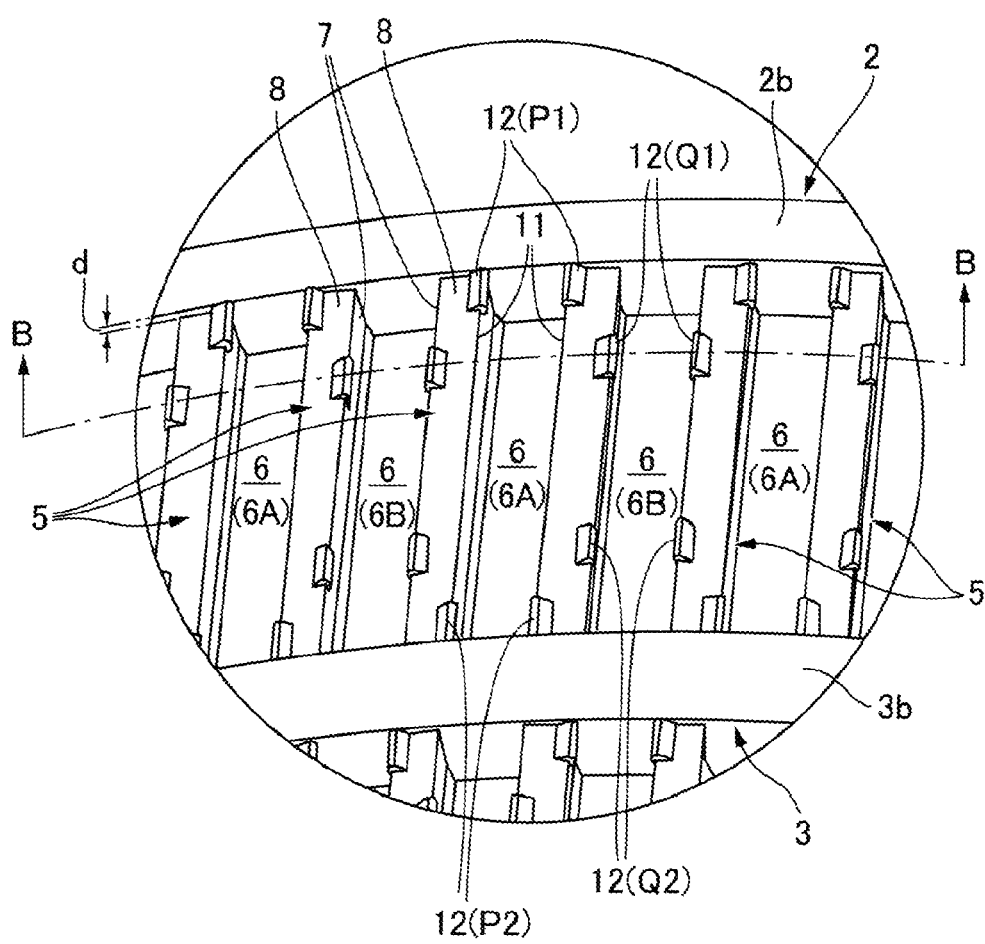
FIG. 2 is a partial enlarged view of this retainer for a roller bearing (an enlarged view of area A in FIG. 1)
Figure 3:
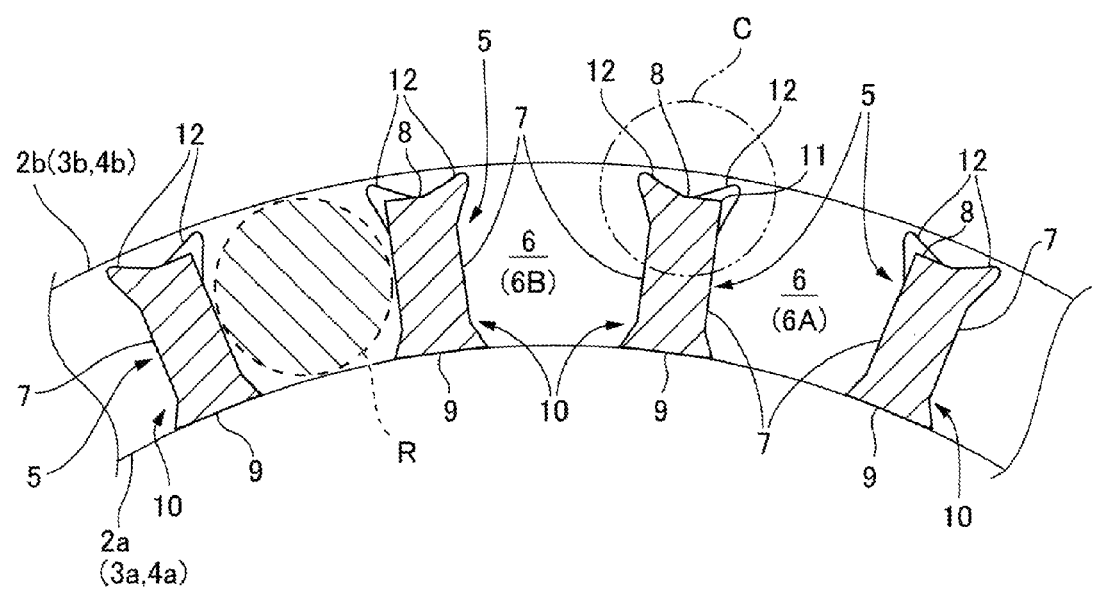
FIG. 3 is a partial cross-sectional view of this retainer for a roller bearing (a cross-sectional view along B-B in FIG. 2.

FIG. 2 is a partial enlarged view of the retainer 1 (an enlarged view of area A in FIG. 1), and FIG. 3 is a partial cross-sectional view of the retainer 1 (a cross-sectional view along B-B in FIG. 2). As shown in the drawings, the partitions 5 have substantially rectangular cross-sectional shapes, each partition having two side faces 7, 7 which face the sides of the adjacent partitions 5, an outer-circumferential-side end face 8 which faces the outer circumferential side of the retainer 1, and an inner-circumferential-side end face 9 (see FIG. 3) which faces the inner circumferential side of the retainer 1. Opposing side faces 7, 7 constitute the inner wall surfaces of each pocket 6. The cross-sectional shape and dimensions of each pocket 6 are designed so as to correspond to the diameter dimension of the needle roller R accommodated therein, and to be capable of rotatably retaining the needle roller R.

Because the first annular section 2, the second annular section 3, and the third annular section 4 described above have the same inside and outside diameters, the inner circumferential faces 2a, 3a, 4a and outer circumferential faces 2b, 3b, 4b thereof (see FIG. 1) are positioned in the same imaginary cylindrical surfaces. The inner-circumferential-side end faces 9 of the partitions 5 are in the same plane as the inner circumferential faces (either the inner circumferential faces 2a and 3a or the inner circumferential faces 3a and 4a) of the annular sections connected to the ends. Specifically, the inner-circumferential-side end faces 9 are in the same plane as an imaginary cylindrical surface that includes the inner circumferential faces 2a, 3a, 4a.

Figure 4:
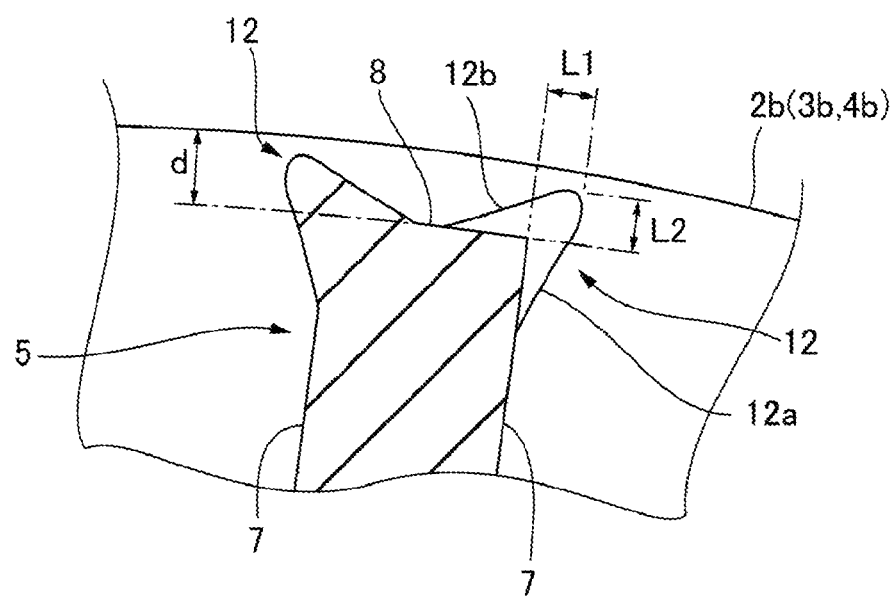
FIG. 4 is an enlarged view of a retaining protrusion (an enlarged view of area C in FIG. 3).

The outer-circumferential-side end face 8 of each partition 5 is provided in a position retracted radially inward by dimension d, shown in FIGS. 2 and 4, from the outer circumferential faces (either the outer circumferential faces 2b and 3b, or the outer circumferential faces 3b and 4b) of the annular sections arranged at the ends. Specifically, the outer-circumferential-side end faces 8 are provided to positions retracted radially inward by a dimension d from the imaginary cylindrical surface that contains the outer circumferential faces 2b, 3b, 4b of the three annular sections.

Trapezoidal cross-sectioned parts 10 that increase in circumferential thickness toward the inner-circumferential-side end faces 9 are provided to the inner-circumferential-side ends of the partitions 5. The opening width of the inner circumferential side of each pocket 6 is thereby reduced, and the needle rollers R are prevented from dislodging toward the inner circumferential side. Excluding the positions where the trapezoidal cross-sectioned parts 10 and the hereinafter-described retaining protrusions 12 are formed, each of the partitions 5 is of fixed width in the circumferential direction.

(Retaining Protrusions)

The retaining protrusions 12 for preventing the needle rollers R from dislodging toward the outer circumferential side are formed in the open edges on the outer circumferential sides of the pockets 6, i.e., on the ridges of corner parts 11 where the outer-circumferential-side end faces 8 and the side faces 7 in the partitions 5 intersect. Two retaining protrusions 12 are formed in each of the corner parts 11 as shown in FIG. 2. Two pairs of retaining protrusions 12 sandwiching each of the pockets 6 and facing in the circumferential direction are formed in the two corner parts 11 constituting the open edge of the same pocket 6.

In the present embodiment, the positions where the retaining protrusions 12 are formed are set so as not to overlap in the adjacent pockets 6 in the longitudinal direction of the partitions 5; i.e., in the center axial direction of the retainer 1. Specifically, the pockets 6 formed in the retainer 1 include first pockets 6A in which a pair of opposing retaining protrusions 12 are formed at the end positions P1, P2 (see FIG. 2) at one end side and the other end side of the partition 5, and second pockets 6B in which a pair of opposing retaining protrusions 12 are formed at near-center positions Q1, Q2 (see FIG. 2) set between the end positions P1, P2. The retainer 1 is configured such that these first pockets 6A and second pockets 6B are arranged alternatingly in the circumferential direction.

FIG. 4 is an enlarged view of the retaining protrusion 12 (an enlarged view of area C in FIG. 3). Each of the retaining protrusions 12 has an inner side inclined part 12a protruding into the pocket 6 from the edge portion at the corner part 11 of the side face 7, and an outer side inclined part 12b protruding more to the outer circumferential side (radially outward relative to the retainer 1) from the edge portion at the corner part 11 of the outer-circumferential-side end face 8. The inner side inclined part 12a and the outer side inclined part 12b are extended so as to cover the corner part 11, and are connected so that their tips form a curved shape. The inner side inclined part 12a and the outer side inclined part 12b protrude to a greater extent further toward the corner part 11. Therefore, the retaining protrusions 12 are shaped protruding more to the outer circumferential side from the outer-circumferential-side end faces 8, and protruding at inclines so that the opening width of the pockets 6 decreases.

Referencing the corner part 11, which is the open edge of the pocket 6, the tip of each of the retaining protrusions 12 protrudes from the corner part by dimension L1 in the circumferential direction (along the width of the opening of the pocket 6), and from the outer-circumferential-side end face 8 more to the outer circumferential side by a dimension L2, as shown in FIG. 4. Setting dimension L2 to be equal to or slightly smaller than dimension d allows the outer-circumferential-side end face 8 to be retracted radially inward relative to the outer circumferential faces 2b, 3b, 4b of first annular section 2, the second annular section 3, and the third annular section 4. The dimensions L1, L2 are set to a necessary minimum limit in order to prevent the needle roller R from dislodging from the pocket 6.

As described above, in the retainer 1 of the present embodiment, the retaining protrusions 12 are not shaped merely to protrude into the pockets 6, but to protrude farther as they progress toward the corner parts 11, and to extend at an incline more to the outer circumferential side past the corner parts 11. Thus, when the retaining protrusions 12 are made to protrude farther to the outer circumferential side than the outer-circumferential-side end faces 8 and are shaped extending at an incline in the direction in which the opening width of the pockets 6 decreases, the tips of opposing retaining protrusions 12 can elastically deform without restriction and the gaps in between can be easily widened, unlike cases of protrusions that merely protrude inward from the inner walls of the pockets 6.

Therefore, when the retainer 1 having these retaining protrusions 12 is molded integrally from a resin, the cores which have the same cross-sectional shape as the pockets 6 are easily forced out to the outer circumferential side and removed, and the force applied to the main bodies of the partitions 5 when the cores are forced out can be reduced. Therefore, the cores can be forced out even when the partitions 5 are made thinner and reduced in strength in order to form more pockets 6, and such a retainer 1 can be molded integrally from a resin.

In the retainer 1 of the present embodiment, the formed positions of the retaining protrusions 12 provided to the pockets 6 are set so as to not overlap in the longitudinal direction of the partitions 5 with the formed positions of the retaining protrusions 12 in adjacent pockets 6. Specifically, the first pockets 6A and the second pockets 6B are arranged alternatingly in the circumferential direction, the first pockets having retaining protrusions 12 formed in the end positions P1, P2 of the partitions 5 and the second pockets having retaining protrusions 12 formed in the near-center positions Q1, Q2 of the partitions 5. The force acting when the cores on both sides of the partitions 5 are forced out is thus dispersed, and force is not concentrated on specific locations of the partitions 5. Specifically, the force is dispersed because it is applied to the end positions P1, P2 from one set of cores, and applied to the near-center positions Q1, Q2 from another set of cores. Therefore, the cores can be forced out even if the partitions 5 are low in strength.

According to the present embodiment as described above, a retainer 1 comprising retaining protrusions 12 can be manufactured by integral molding from a resin even when the dimension of the retainer 1 in the radial (thickness) direction is reduced in order to use thin needle rollers R, and even the circumferential thickness of the partitions 5 is reduced by narrowing the spaces in which the needle rollers Rare placed. A needle roller bearing can be formed by placing this retainer 1, which rotatably holds numerous needle rollers R arranged at a fixed pitch in the circumferential direction, between an inner race and an outer race.

The retainer 1 of the present embodiment comprises two rows of pockets 6 arranged in the circumferential direction, but may also be configured to comprise only one row, in which case it is possible to omit the third annular section 4 and the partitions 5 arranged between the second annular section 3 and the third annular section 4.

The invention claimed is:

1. A resin-formed retainer for a roller bearing in which a plurality of pockets for rotatably holding individual needle rollers are arranged at a fixed pitch in a circumferential direction; the retainer for the roller bearing comprising:
   a plurality of partitions for partitioning adjacent pockets, the partitions extending in a center axial direction of an arrangement of the plurality of pockets; and
   retaining protrusions integrally molded on each of the partitions;
   each of the partitions having side faces that face sides of adjacent partitions, and an outer-circumferential-side end face that faces an outer circumferential side of the arrangement of the plurality of pockets;
   the retaining protrusions being provided in corner parts where the side faces and the outer-circumferential-side end face of each of the partitions intersect;
   each of the retaining protrusions having an inner side inclined part that protrudes from the side face and protrudes progressively farther towards a side of the corner part, and an outer side inclined parts that protrude from the outer-circumferential-side end face and protrudes progressively farther towards the side of the corner part; and
   a tip of each of the retaining protrusions, which is a connected extension of the inner side inclined part and the outer side inclined part so as to cover the corner part, protruding more to the outer circumferential side by a predetermined amount from the outer-circumferential-side end face and extending to a position of protruding in the circumferential direction by a predetermined amount from the side face.

2. The retainer for the roller bearing according to claim 1, wherein
   the retaining protrusions protruding into the pockets are arranged so that positions thereof in the center axial direction do not overlap positions of the retaining protrusions protruding into adjacent pockets.

3. The retainer for the roller bearing according to claim 2, wherein
   the plurality of pockets include:
   first pockets in which the retaining protrusions are provided to one end and another end in the center axial direction of the partitions;
   second pockets in which the retaining protrusions are provided to predetermined positions between the one end and the other end of the partitions, and
   the first pockets and the second pockets being arranged alternatingly in the circumferential direction.

4. The retainer for the roller bearing according to claim 1 comprising:
   a first annular section and a second annular section arranged coaxially with the arrangement of the plurality of pockets and sandwiching the partitions from both sides in the center axial direction,
   the plurality of partitions linking the first annular section and the second annular section to each other,
   outer circumferential faces of the first annular section and the second annular section being in a same imaginary cylindrical surface, and
   the outer-circumferential-side end faces of the partitions being provided in positions retracted by a predetermined dimension radially inward from the imaginary cylindrical surface.

5. The retainer for the roller bearing according to claim 1, wherein
   an arrangement in which the plurality of pockets are arranged at a fixed pitch in the circumferential direction is formed in two rows in the center axial direction of the arrangement;
   the plurality of partitions are configured from a first partition group in which the pockets constituting one of the two arrangements are partitioned apart from each other, and a second partition group in which the pockets constituting the other arrangement are partitioned apart from each other;
   a first annular section, a second annular section, and a third annular section are arranged coaxially with the two arrangements;
   the first annular section, the first partition group, the second annular section, the second partition group, and the third annular section are arranged in the stated order along the center axial direction;
   the partitions of the first partition group link the first annular section and the second annular section to each other; and
   the partitions of the second partition group link the second annular section and the third annular section to each other.

6. The retainer for the roller bearing according to claim 5, wherein
   outer circumferential faces of the first annular section, the second annular section, and the third annular section lie in a same imaginary cylindrical surface, and
   the outer-circumferential-side end faces of the partitions constituting the first partition group and the second partition group are provided to positions retracted a predetermined dimension radially inward from the imaginary cylindrical surface.

7. A needle roller bearing comprising:
a plurality of needle rollers arranged at a fixed pitch in a circumferential direction are rotatably held by the retainer for the roller bearing according to claim 1.

* * * * *